United States Patent
Wittkotter

(10) Patent No.: US 6,674,859 B1
(45) Date of Patent: Jan. 6, 2004

(54) DEVICE AND METHOD FOR THE PROTECTED OUTPUT OF ELECTRONICALLY TRANSMITTED AND STORED DOCUMENTS

(75) Inventor: Erland Wittkotter, Ermatingen (CH)

(73) Assignee: BrainShield Technologies, Inc., New York, NY (US)

( * ) Notice: Subject to any disclaimer, the term of this patent is extended or adjusted under 35 U.S.C. 154(b) by 0 days.

(21) Appl. No.: 09/485,057

(22) PCT Filed: Aug. 5, 1998

(86) PCT No.: PCT/EP98/04888

§ 371 (c)(1),
(2), (4) Date: Feb. 2, 2000

(87) PCT Pub. No.: WO99/08171

PCT Pub. Date: Feb. 18, 1999

(30) Foreign Application Priority Data

Aug. 5, 1997 (DE) .......................................... 197 33 807
Dec. 11, 1997 (DE) .......................................... 197 55 182

(51) Int. Cl.[7] .............................................. H04L 7/167
(52) U.S. Cl. ...................... 380/243; 380/201; 380/255
(58) Field of Search ................................ 380/243, 201, 380/255

(56) References Cited

FOREIGN PATENT DOCUMENTS

| DE | 196 34 712 A1 | 12/1997 |
|---|---|---|
| EP | 0 798 619 A2 | 1/1997 |
| KR | PCT/KR 96/00066 | 2/1996 |
| US | PCT/US 93/08069 | 6/1991 |
| US | PCT/US 96/16348 | 11/1996 |
| WO | WO 92/09160 | 5/1992 |
| WO | WO 96/35158 | 7/1996 |
| WO | WO 97/14087 | 4/1997 |

OTHER PUBLICATIONS

Abhijit K. Choudhury et al: *Copyright Protection for electronic Publishing Over Computer Networks*, 8302 *IEEE Network*, 9, No. 3, May/Jun. 1995, New York, US.

*Primary Examiner*—Thomas R. Peeso
(74) *Attorney, Agent, or Firm*—Alston & Bird LLP

(57) ABSTRACT

The invention relates to a device for the protected output of an electronically transmitted and stored document which is provided with or which is subject to electronic copy protection, comprising a storage unit provided on a local computer system, for storing the document and preparing it for output, a local processing and control unit which co-operates with the storage unit and with an external data processing installation by way of a data communication network, the processing and control unit being such that an additional operation and/or additional data can be linked to the document as a reaction to at least one online contact by way of the data communication network, and the linked document can be processed for output, an output unit which is connected to the local processing and control unit and which is adapted for appropriate output of the linked document, and an interrogation and checking unit which co-operates with the storage unit and the processing and control unit and which is adapted to detect a violation and/or override of the document copy protection and as a reaction to such a violation and/or override prevents production of the linked document by the processing and control unit.

8 Claims, 2 Drawing Sheets

Figure 1:
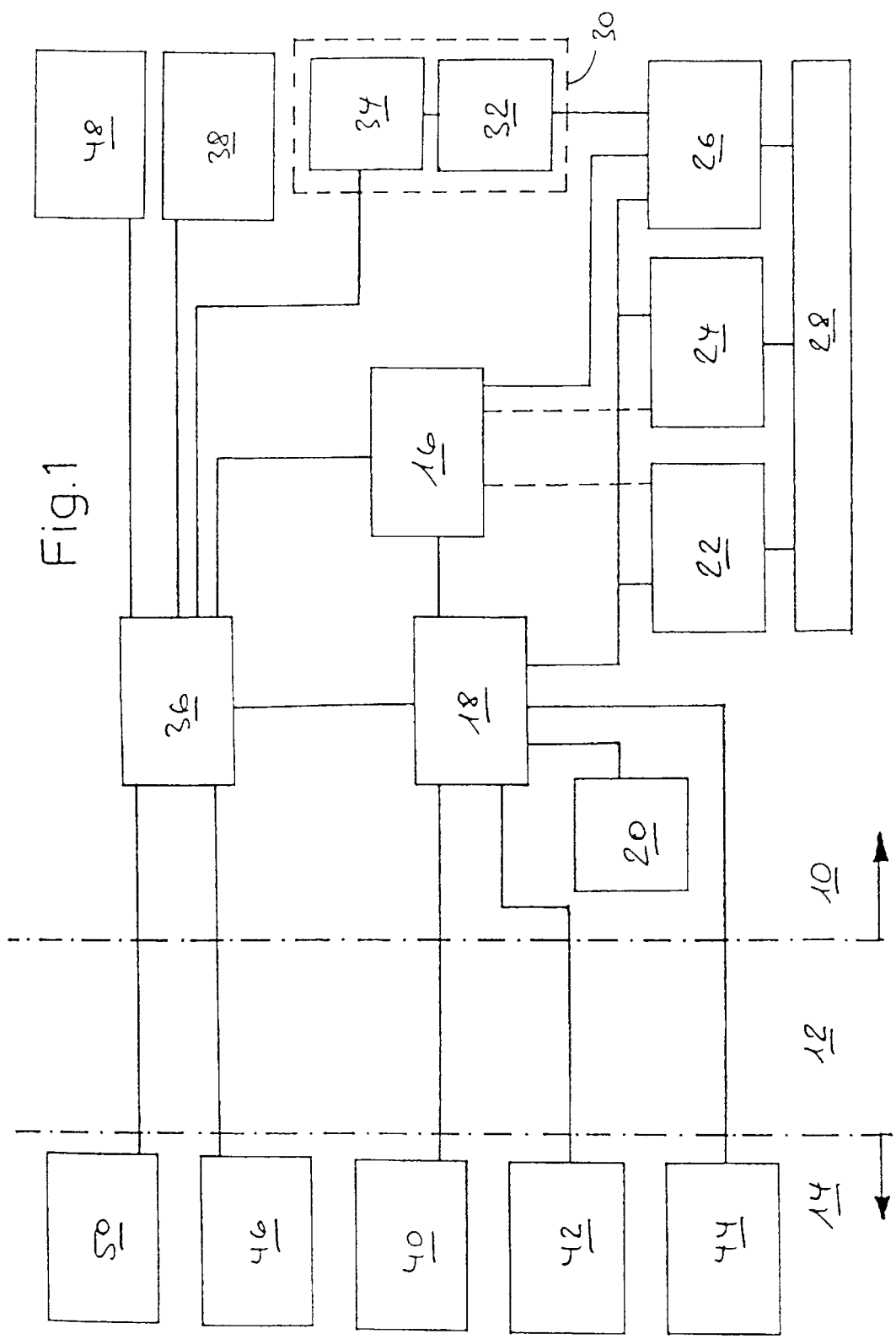

DEVICE AND METHOD FOR THE PROTECTED OUTPUT OF ELECTRONICALLY TRANSMITTED AND STORED DOCUMENTS

The present invention concerns a device for the protected output of electronically transmitted and stored documents provided with electronic copy protection, and a corresponding output method, in particular a method of operating the device. The present invention concerns in particular protection for electronic documents on a computer system, which is still operative even when a copy protection mechanism provided for the document has been switched off or overridden.

The state of the art discloses numerous devices and methods for the electronic publication of documents, in which respect the term electronic documents in accordance with the present invention is used to denote not just texts and images but also data banks, audio media, videos, animations, interactive films, control programs, active and passive computer programs and the like usable arrangements of electronic data. In this respect documents which are valuable in terms of copyright are often available in a form in which they are protected from copying, either by virtue of suitable encoding or encrypting methods, by virtue of special (proprietary) formats for a data file, characterising and/or individualizing recognition features or by suitably set, secret software interfaces. There are also solutions in existence, which for decoding purposes supply necessary data or items of information externally, for example by way of a data communication network.

All solutions of that kind however suffer from the disadvantage that, as soon as the copy protection or use protection has been circumvented by a suitable measure, an electronic document can be at any time locally manipulated and in particular also can be passed on as desired and in unlimited fashion. More specifically, due to the digital character of the documents, any copying procedures can be implemented without a loss of quality, so that after copy protection has been successfully removed, there is then an—illegal—copy which in terms of quality does not suffer from any detriment in relation to the original.

The state of the art hitherto does not offer any measures which can be used when copy protection is overridden in order to move an end user towards use of the original, in a technically supportive fashion, when the situation involves making a decision between an original and an illegal digital copy which can be unlimitedly used.

The state of the art discloses copy protection methods in which a password or a key must be supplied as additional data by way of the network. The disadvantage of these methods is that only a very limited number of barriers has to be overcome in order to put the document into a condition in which access without online authorization appears possible. The nature and the structure of the additional data which must be used for enablement purposes with that method are already very substantially established upon generation of the document or prior to the moment in time of enablement. The additionally supplied data in addition do not include any benefit or value which can be viewed independently of the enablement procedure. Delivery of the data is implemented only for reasons which are related to direct security and not for reasons which are linked to an improvement in the use or value of an electronic document.

In particular in relation to electronic documents which involve a considerable value for the authorized creator thereof, successful overriding of the copy protection therefore means that the right and the option for the author to effectively assert his property rights in respect of the document are limited or even rendered impossible.

These problems are made more severe by virtue of the fact that there are numerous service or auxiliary programs for computer systems, the purpose of which is to overcome copy protection on an electronic document and the effectiveness of which, with the present copy protection mechanisms, is continuously increasing.

Therefore the object of the present invention is to protect electronically transmitted and stored documents even when a copy protection mechanism in respect of such documents has been removed or overridden, wherein "protection" in accordance with the present invention is used to denote any difficulty or any impairment in terms of options of use in respect of an illegally copied document in relation to an original (or a legal, authorized copy). The invention also seeks to provide a corresponding method.

That object is attained by the device having the features of claim 1 and the method having the features of claim 6.

Advantageous developments of the invention are set forth in the appendant claims.

Advantageously, in accordance with the present invention, use is made of the fundamental principle of embedding the electronic document to be protected in a system environment which offers the additional operation and/or the additional data, wherein the additional value or gain to be achieved thereby can be implemented by the action of the interrogation and checking unit only when the copy protection has not been violated or overridden. A prerequisite in that respect is that the copy protection used is of such a kind that overriding or violation thereof can be detected by suitable criteria—for example within the document or within software environment interfaces which are to be used—by means of the interrogation and checking unit.

In addition, in accordance with the invention, advantageously at least one online contact is used by way of data communication network ("session") in order to produce the additional data or to permit the additional operation to be implemented. In that way the generation of the additional use value or information value for the (authorized) user is possible, in a particularly secure and flexible fashion.

In accordance with the above-indicated definition, electronic document files which can acquire an additional value by additional data which in particular are only present externally are suitable for the invention, as electronically transmitted and stored documents in accordance with the present invention, in which respect the electronic documents embraced by the invention are to be separably joined to that additional value. In that case the additional operations in accordance with the invention concern in particular data processing and operating procedures which produce that additional value.

In a corresponding fashion, additional operations in accordance with the invention are procedures on a computer system which can be implemented with, on and/or together with the document, and give an advantage over the original document, and which are not present without those procedures on the computer system. In specific terms, additional operations of that kind can involve the provision of an online access for a (selective) update of the document, management of key words and notes, a representation of additional management data, storage and/or representation of reading marks or bookmarks, an additional storage/representation of color marking of text passages, implemented by the user, an additional access interface for searches in associated or superior archives, the use of further services such as electronic document exchange with relevant authors or publishing houses and the use of an electronic blackboard provided for the document. In that respect the items of additional information can have been acquired as rights in respect of use (use rights) at no cost in connection with registration of the electronic document. Those additional values and data can equally well be marked separately and independently and billed by way of a billing unit. In accordance with the invention in particular the following measures are also preferred examples in respect of additional operations or additional data.

The data management envisaged can also be for example the management of rights in respect of use on documents or parts of documents which have been paid for or otherwise acquired by the end user. In that way repeated use can be selectively offered to the user without payment.

In addition an overview about the various document versions or editions or update stages can be outputted on the client computer in respect of selected document by the server management unit.

In addition a characterisation of the changes between any two or more versions can be outputted as additional value.

The output of further document titles which are in the circle of themes of the document to be protected can also be an additional value. The same category also includes the output of a passage or a list of passages from the document to be protected, which after interrogation of one of the various retrieval systems best meets the reading intention of the user.

A further value can lie in the output of a translation or a translation aid by the server management unit. That can involve for example the subtitles for a film, which are not part of the film. Alternatively, there can be current aids for the translation of given passages from a document, which occur when using a document. That can also include visual and/or parallel output of a music text and/or the associated translation.

A further additional value can lie in the deliberately interrogated output or standard output of user statistics which can be applied with the electronic document or produced therewith. That value can give the user indirect orientation about the quality of the document or a passage. The output could then include for example the frequency of duplicate use of certain passages, an overview or ranking in relation to the most frequently used passages or the frequency of use of comparable documents.

Further protection by management can also provide outputting the names of the persons who have already acquired knowledge of the document. Besides the additional information for the direct user, an additional value can also be produced or acquired, for any one or more further parties, insofar as they are permitted access to the document or selected services which can be associated with that document.

A further additional value can provide that data can be entered in a document, for example as a form, at predetermined positions, by a client user, manually or under the control of a script, which data are finally linked on the server side to specific actions. Integrity of the document, that is to say protection from change, is afforded by the specific use value. Copy protection can thus also be interpreted in each case as protection from improper change in the document.

It is not out of the question that the copy-protected document can be outputted on the computer system both in its (original) format and also in a modified format (with overridden copy protection); in the case of removal of copy protection however the user suffers a detriment in terms of value. (In general terms, in accordance with the present invention, a copy protection method in the broad sense is understood to mean not only any way which is suitable for preventing an unauthorized copy of an electronic document or making such a copy more difficult, but also a method which contributes to a reduction in quality of a copy; in the case of case of electronic documents this can be effected for example by a picture screen content, for example with an illustrated text, being copied as such and disseminated. For the subsequent discussion a correspondingly manipulated document with overridden copy protection is referred to as "cracked").

In addition copy protection is to be interpreted not only as protection from illegal production of a copy of the original, but as monitoring on the part of the publisher to prevent use of a copy in the intended sense or to make such use difficult, that is to say in the sense of protection from use.

A protection from use can also provide that a copy recognises that it is being used in an altered context and that fresh billing can arise therefrom, with the aim that it finally requires renewed enablement for use of the document.

Even if therefore the cracked document can be read or used within an editor, a viewing unit or viewer or a data bank, it is however not possible in accordance with the invention to use the additional value in the form of the additional operations and/or the additional data. Accordingly in accordance with the invention the disadvantage of the illegal copies lies in the absence of those additional value options.

The additional values of the document consist of the additional options which can arise within a suitable computer program by virtue of the addition of one or more further features and/or items of information or one or more further functions or operations which can occur outside the locally concluded database and/or the locally concluded functional extent of the electronic document.

A contact which is to be interpreted as being online in accordance with the present invention is one which claims digital information or digital services outside the local computer system by way of the data communication network. While the Internet is for example preferred for that purpose, the subsequent supply of additional items of information can also be implemented by way of another physical channel than by way of the bidirectional Internet. The additional data can also be transported to the client, after registration or verification dialogue, on a uni-directional communication medium (broadcast, satellite, uni-directional wide-band cable).

A software environment comprises operating system instructions or operations which are afforded within a computer program as interfaces.

A software environment can be identified as secure if the complication and expenditure in respect of time or material for finding a clever combination of commands within the software environment is too great that, from economic points of view, the use of the cracked document would be worthwhile for a hacker and/or for the user.

The integration of an electronic document into a software environment means that there is the possibility of the operations and instructions presented from the software environment being meaningfully applied to the electronic document. Integration can also be conversion which is implemented in accordance with fixed rules or in accordance with an algorithm and the output product of which can then be used.

The term right in respect of use is used to denote the right of a user to use a document in an established framework.

That right in respect of use can be limited in terms of time or space. A right in respect of use in particular does not imply any right of transmission to a third party.

In a corresponding fashion the processing and control unit according to the invention permits both passive management of the electronic documents in which data and relationships are stored in a structured, object-oriented or relational manner. The processing and control unit can also be implemented in the form of a software environment into which optionally local services or programs can be integrated or by which services can be taken or accepted from an external server by means of remote data transmission by way of the data communication network. In addition the processing and control unit permits active management, for example by the user-guided input of notes to a document; in addition updating of the managed documents can be viewed as active management of that kind. (In that respect for example a communication from an external server that a change to the document has been made or a further comment has been posted to a public blackboard in relation to the document is viewed as an active management procedure, controlled by the processing and control unit).

A proprietary document format can have encryption to protect it from unauthorized use of the content. A document can be considered either as passive software or as an active program, in regard to which meaningful use is possible only by the provision of the associated software interfaces of a software environment.

Integration of the electronic document, in the above-described manner, into the management unit afforded by the local processing and control unit, can be made possible in that respect by an online procedure, but alternatively it can also be effected locally.

Protection by management involves the exclusion of illegal copies. Protection by management affords a second barrier in regard to protection in respect of use, which becomes operative automatically when the illegal copy or the original is used by an unauthorized user. Registration of the document must precede, to characterise illegal use. In that sense, the method described in this invention, from the point of view of the user of the document, offers only limited use in relation to unregistered use.

In a particularly preferred feature there is provided an additional input interface which as a reaction to an enablement signal from the interrogation and checking unit makes it possible to introduce or implement an electronic communication, in particular by way of the data communication network, with an author of the electronic document, who is identified as additional information. In that way, suitable and appropriate processing is supported precisely in relation to dynamic documents which are subject to development and/or a (for example scientific) dialog. That also affords completely new and efficient ways of carrying out scientific operations.

Limitation of use in respect of time cannot be implemented on a local computer which is under the total control of an outsider as the system time on the computer can be changed over at any time. Protection by management would mean in contrast that a user, in a passive sense, cannot have the certainty that his hacked document is still current, or whether further relevant items of information are not still missing. The external server which must be addressed in the context of security by management cannot be deceived by that manipulation. In an active sense however the use of the other managed documents can also be limited, after local manipulation.

With protection by management, with an illegal change to a user status of a managed document, the normal use of other documents inter alia can also be altered or only partially altered but limited in such a way as to cause problems, as long as this unintended change in status persists. The integrating and combining character of management affords the possibility, due to the risk of loss or violation of individual rights in respect of use, out of the quantity of all other documents, of obtaining protection for an individual document, transferred from the entirety. The communication that the situation involves a temporary and/or conditioned change in the use status, can be given to the user with the intention of causing the user to restore the intended and entitled status of the previously altered document or possibly erase the illegal copy.

In a preferred fashion, local installation and introduction of the documents in the management program should be effected only together with payment and/or online registration and/or upon first use. Subsequent installation and introduction of the document into the management program can be effected only when proof of payment or proof in respect of reliable enablement can be securely provided. A subsequently installed and possibly unpaid document should be reliably distinguishable from a correctly installed document. An additional billing module can provide for subsequent payment and registration. An authorized user can be distinguished from an unauthorized user only when a suitable identification module or authentication module permits a distinction to be drawn between users and thus attributes the rights in respect of use and therewith also the option of use only to be authorized users.

In a further advantageous feature registration of a relevant document takes place in a local and/or external registration unit; the action of that registration unit provides for permanent, checkable embedding of the electronic document in the system environment for use of the additional operations and/or the additional data. In particular it is then possible for the local processing and control unit, by interrogation of the external or local registration unit, to check the authenticity status of a document, without (renewed) checking of the actual document, in respect of copy protection, having to be necessary. In particular registration can also be effected in an anonymous manner—without specific identification of a user.

In a further preferred feature it is also provided that the online contact according to the invention between the processing and control unit and the external data processing installation is encrypted, and in a further preferred feature is effected in accordance with a preceding, individualizing keying agreement.

Figure 2:
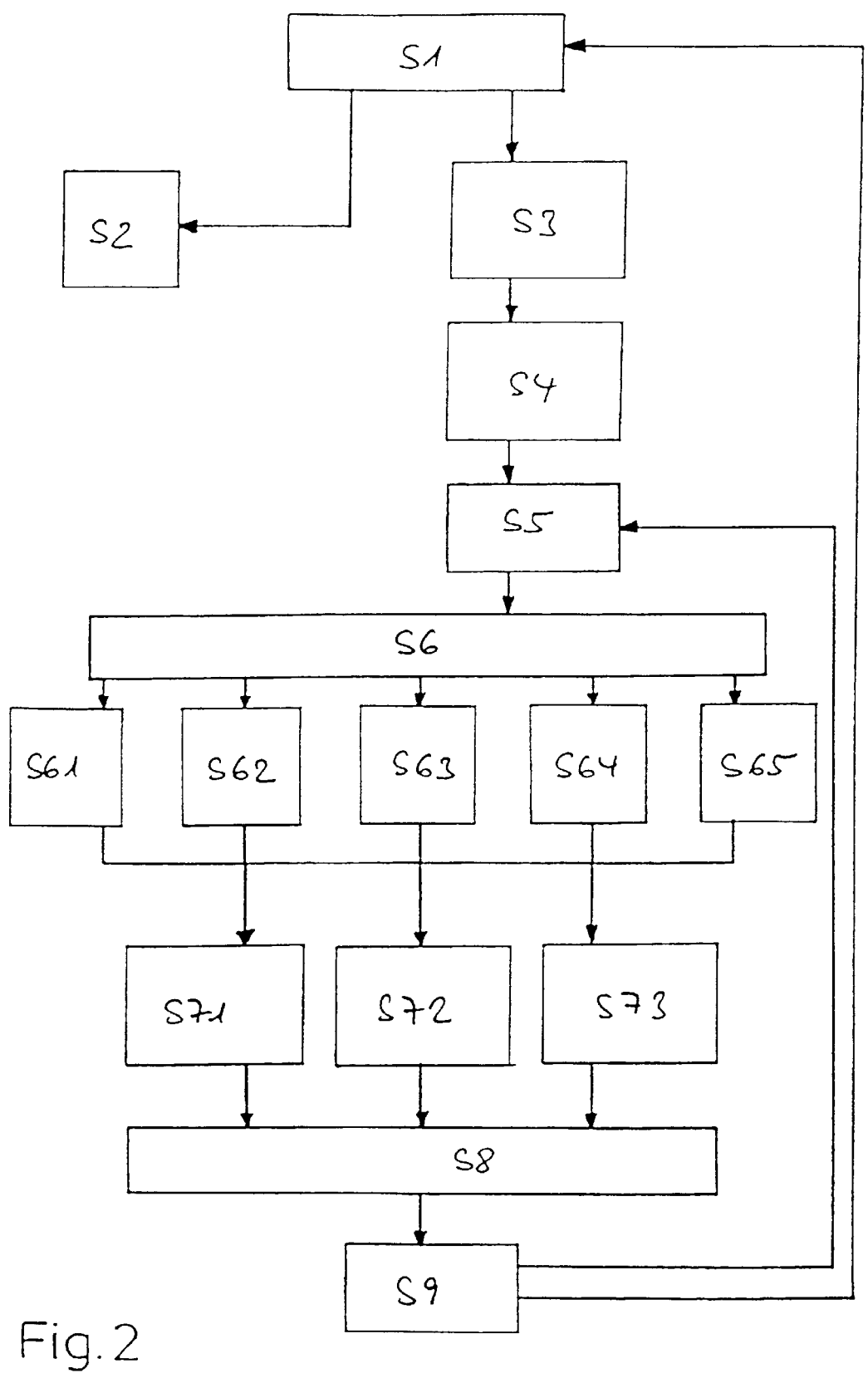

Further advantages, features and details of the invention will be apparent from the following description of preferred embodiments and with reference to the drawings in which:

FIG. 1 shows a block circuit diagram of the device according to the invention for the protected output of electronically transmitted and stored documents in accordance with a first preferred embodiment of the invention (best mode), and FIG. 2 shows a flow chart with essential processing steps of the method according to the invention for the protected output of the electronic document.

As shown in FIG. 1 by means of the dash-dotted lines, a local computer system (in the form of a PC) 10 is connected by way of a data communication network 12 to an external data processing installation 14, wherein by way of example the network 12 can be implemented in the form of a publicly accessible data network, for example the Internet, and the external data processing installation can be implemented in the form of a remote host.

Locally, the computer system 10 has a local input unit 16, for example a keyboard, which is connected to a local, central control and processing unit 18. The unit 18 is implemented for example by the CPU and associated peripherals of the PC; connected to the control unit 18 is a local data store, for example a working memory or a read only memory.

The central control unit 16 also acts on the output side on a local output unit 22, a local service/duty unit 24 and a local document output unit 26 which are respectively connected to suitably adapted output hardware 28. To put that more precisely, the units 22, 24, 26 are various application programs, interfaces or other modules which are essential for document output and which, operated by the central control unit 18, can prepare and control a respective output operation for the output hardware, for example a display screen, audio hardware or a printer. By way of example the local output unit 22 can be a viewer or a printer driver, the local service unit 24 can be a linking device for producing a connection to further, locally or externally present documents, a search module for specifically searching for individual words in a text, an editor for detecting notes or comments, and the document output unit 26 can have an electronic output module for sending the document for example in the form of e-mail. Depending on the specific set-up of the units 22, 24, 26, there is a direct connection to or control by the local input unit 16.

In particular the document output unit 26 is also to be interpreted in such a way that an electronic document, even in the cracked condition, that is to say with copy protection removed or overridden, can be outputted directly therewith; then, obviously without the increased value implemented in accordance with the invention. In the practical implementation therefore the document output unit can be a text editor or the like which can provide for output of the document. That situation is also made clear moreover in FIG. 1 by virtue of the fact that the document diagrammatically indicated at 32 in a document memory or store 30—without copy protection—can be passed directly to the document output unit 26 while the (legal, authorized) document 32 with copy protection (diagrammatically identified by reference numeral 34) cannot be directly outputted from the local computer system 10.

On the contrary, provided for that purpose is an interrogation and user-right unit 36 which interacts with the central control 18 and the local input unit 16 and which, as a reaction to a corresponding demand, for example by a keyboard 16, reads a document 32 with copy protection 34 out of the document store 30.

Before then an output of that document is possible, possibly using the additional operations according to the invention, as are also afforded for example by the units 22, 24, the interrogation unit 36 carries out a check to ascertain whether copy protection is still present, more specifically by means of a local checking unit 38 associated with the interrogation unit 36. The unit 18 provides that, if the presence of the copy protection is found to be positive (that is to say, the document is not a document copied without authorization), by way of the central control unit 18, the document in the intended manner can be provided with additional data or can be linked to an additional operation which are acquired by access by way of the data communication network 12 to an external additional data unit 40 and/or an external service/duty unit 42. Thereupon a suitably linked or modified document is then transmitted to a suitable local output unit 22 through 26 and outputted in the appropriate fashion by way thereof.

It is also possible that, for the purposes of carrying out the additional operation, the central control unit 18, by way of the data network 12, accesses an external data store 44, in order to acquire suitable data therefrom or to carry out storage operations therewith.

The embodiment of FIG. 1 also shows that the interrogation unit 36 can additionally access by way of the network 12 an external checking unit 46 (in addition to or alternatively to the local checking unit 38) in order to establish the current protection status of an electronic document.

As FIG. 1 further shows, connected both locally to the unit 48 and also externally by way of the network 12 to the unit 50 is a registration unit for the respective document, with which then after checking has been implemented in respect of copy protection by the checking units 38 and/or 46 the check status of a respective electronic document can be established and can be prepared for access by the central processing unit 18. In that way, in the event of renewed access or in the event of again intended output of the electronic document, only checking of the registration units 48 and/or 50 is necessary.

Overall, the described device permits secure preparation of the electronic document for the desired output, and it is guaranteed in particular that an unauthorized user of the document who has acquired it for example by an inadmissible copying operation cannot output it using the additional operations and/or additional data provided in accordance with the invention.

Reference will now be made to FIG. 2 to describe the mode of operation of the arrangement shown in FIG. 1 by means of two specific examples.

It is assumed in the first example that a text stored in the document store or memory 30, in the form of a technical description, is to be read by a user on a display screen and is thereafter to be outputted by a printer. It is advantageously also provided that, on the part of the external data processing installation 14, a host computer of the manufacturer of technical installations and the author of the technical description, a respective most up-to-date version of that technical text is made available by way of the network 12, more specifically only to the users who have (out-of-date) versions of the document, if registration and authentication provided in accordance with the invention have been implemented.

Accordingly, in the flow chart in FIG. 2, in a step S1, the desired document is called up out of the document store 30 by input into the local input unit (keyboard) 16. That document is provided with copy protection 34 in the form of a proprietary data file format which has the user as being authorized. Now, in a step S2, by using a suitable reading program, the user could admittedly also read out the document 32 directly, in particular by-passing the copy protection, and output it on a screen or viewer, but in that way he would be denied the option for example of acquiring a respective most up-to-date version of the document.

Therefore, in step S3, status interrogation is effected by way of the control unit 18 and the local checking unit 38 and/or the external checking unit 46, to ascertain whether the document 32 contained in the document store 30 is actually still a properly protected document, that is to say a document which is present in the proprietary data format. If the checking units 46 or 48 affirm that, then step S4 provides for the output of a suitable positive authorization signal to the control unit 18, whereupon once again in step S5 suitable inputs are then possible by way of the local input unit 16, for example interrogation to ascertain whether an up-to-date version of the document is actually to be fetched.

In step S6, depending on the respective intended output or character of the electronic document, division into various suitable processing operations is then effected, corresponding to the functional components of FIG. 1; thus, step S61 would involve access to external services of the unit 42, in order for example to use the update service of the remote host 14. Step S62 would then provide that external additional data can be unloaded from the additional data unit 42, for example a supplement to the description in the text, in order subsequently to transfer same into the local computer system 10. In this operation, step S63 could also provide for use of the external data memory or store 44, for example as a buffer memory for data transmission. Step S64 then makes use of the local data memory or store 20, for example in order there to buffer the received data, while step S65 could involve the use of a local update routine in the local service unit 24 in order also to produce the current version of the document on the local computer system 10.

In accordance with the intended output, output processing is then implemented in at least one of the steps S71, S72, S73; thereupon, in step S8, the appropriate local output hardware is activated for the output operation.

In the specific example herein, for example by way of a local output program in accordance with unit 22, in step S72, the text would be outputted on a display screen (as an example of a hardware unit 28) after the additionally received, up-to-date items of information have been introduced into the text of the description, in step S71, by means of the local service unit 24. There would then also be the possibility in a step S73 of formatting the document with possible notes or other useful additional functions, in a suitable printing format (unit 26), so that it can then subsequently additionally be clearly outputted on a printer in step S8.

With the possibility of a fresh input in step S9, the routine shown in FIG. 2 goes back to the beginning to step S1 or however permits new or alternative output options in respect of the document which has already been checked and thus authorized for the additional operations and/or data, by virtue of renewed input in step S5.

A further example would involve implementation of a computer game which is contained as document 32 in FIG. 1 in the data store 30. That computer game however can only be used in a severely limited fashion without up-to-date additional items of information which are transmitted by way of the data processing network, such as orienting graphics or game structures.

Accordingly, the action of the central processing unit 18 and the local and/or external checking unit 46 in the above-described manner provides for authorization before the central processing unit 18 can externally supply those additional data by way of the network 12 and can locally prepare same, for example by means of the service unit 24, in the game program, for output onto the display screen and/or for the further interface units, for the user.

A document can be separated into an unchanging fixed part and a variable changeable part which does not necessarily have to be present. The unchanging part of a document can form a closed or self-contained entity. That part can also be transmitted in the form of a complete, unshortened document, to the local computer of the user. The variable part comprises subsequent changes within a document which has already been transmitted, or further added data for the document which is locally already present, or the added data which occur only upon visual and/or acoustic and/or mechanical and/or aromatic output.

Due to storage of the data of a complete document, there is an unchanging part which does not alter in respect of time on a local computer, which lies outside the direct access options of an owner of copyright. That unvarying character of a document on the other hand invites precisely infringement of copyright. The invention is accordingly based on the notion that a variable part must be appended to a document so that, by virtue of its additional value, it additionally safeguards the unchanging, invariable part in relation to unauthorized use which in that case comes about only by by-passing the existing use protection mechanisms.

The unchanging, invariable part of a document, in the case of a document which in the context of a predetermined software environment does not have any potential for a variable change, forms a closed or self-contained, locally complete structure. In the case of a document which can be variably altered or expanded by online services, that local completeness can only be brought about after offering of the online additional value, within the framework of the current use relationship.

In accordance therewith, digital music data, after publication or public transmission or broadcasting, are present on the part of the receiver, in the form of an unchanging quantity of data. After the use protection methods contained therein have been overcome, that quantity of data, without further technical obstacles, can be further distributed and used without authority. That unchanging quantity of data however can be supplemented by further additional items of information and improved in respect of the value thereof. As the additional items of information can be for example further activities of the composers or the musicians, the additional value can be kept continuously variable.

Just the possibility of being able to offer variable additional items of information within the context of predetermined software interfaces is already sufficient to give rise to the impression that something is missing if the variable part was not interrogated, although the document was possibly offered without those additional values.

The harm done by illegal use is related to the degree of dissemination and distribution of an illegal document. The greater the number of users who have such a document, the correspondingly greater is the distribution and dissemination potential. In the case of a document which possibly lacks some features or items of information, on the one hand there is not the danger that the use protection involved therewith is eliminated. On the other hand, there is no potential for passing on or taking that piece of music, as at any event management of the individual music titles is necessary and indispensable. Without this additional management therefore there is the chance that an illegal document is lost in the mass of other data and thus the probability of damage being further spread is kept within limits. In particular the limitation of representing music titles in an exposed manner or identifying them in such a way that they can be easily found again can impede the distribution of illegal copies.

Besides the above-described configurations, it is possible for the principles and implementations of the present invention to be supplemented by a specific copy protection mechanism and a transmission method in respect of electronically published documents, as it disclosed in German patent application No 196 34 712 or the applicant's PCT application PCT/EP 97/03113.

The technical teaching of that document is to be deemed to be incorporated to its full extent into the present application, in particular in regard to the structural configuration of the transmission apparatus, the updating, data preparation and encryption methods and the identification, updating and evaluation of word positions in a text document.

In addition a further aspect of the present invention will now be described, which expands and supplements the above-described embodiments:

The security of a document is based in an alternative embodiment on the uncertainty as to whether the published document does or does not actually contain the originally correct content. The context can be completely destroyed by changing the position of important words within such a document. The omission of the word "not" within a sentence will reverse the information contained therein, so as to express the contrary. Words with the property that they can very greatly change the meaning of a sentence are to be found in any language. Those words can be put together in a list of strategic words. Omission or replacement of one of those strategic words within a text cannot be recognised within the limits of an existing language grammar book.

In the German language, the words: "not", "and", "or" belong to those strategic words. In addition, conjunctions which connect together, exclude, oppose or compare, as linking words, can be altered in such a way that the content of a sentence remains grammatically correct. Numerals such as "one", "two" etc. can be interchanged with each other without this being apparent to a reader who is not paying attention.

In the same manner, the inclusion of a word from a previously established list of words can also completely change the content of a sentence within a document. That change cannot then be detected by a person who is not familiar with the content of the document.

Furthermore, for very many words, thesauruses give one or more words bearing the opposite meaning. Replacing those words with their opposite would destroy the sense and the earlier context of the document.

The uncertainty as to whether a change has been made already occurs when there is already a device which is capable of changing a document in such a way that the content thereof is then of a new, modified meaning, without that change being observed.

The device for reading and using such documents then comprises an output module to which then the correct items of information for positioning the strategic words or the correct word instead of another word are supplied by way of an online connection, when use protection which goes beyond that has not been eliminated or by-passed.

The device for automatically but possibly pseudo-randomly removing strategic words comprises an identification module which is capable of identifying words from an existing list in a document and an extraction module which is capable of erasing those identified words and then storing instructions in such a way that the original can subsequently be restored with those instructions.

A further device can additionally be capable of positioning words from a predetermined list within sentences in such a way that, within same and with a grammar which forms the basis of the language, it is not possible to see whether those words were originally also contained at those locations within the document. This device must therefore operate with rules which make it possible precisely to identify the positions at which that word would not represent a grammatical error.

After identification of those positions, the introduction of a word within the existing document can be effected by a grouping module, in which case additional working instructions can be generated, with which the original condition can be subsequently restored.

What is claimed is:

1. A device for the protected output of an electronically transmitted and stored document (32) which is provided with electronic copy protection (34) or which is subject to copy protection, comprising
    a storage unit (30) provided on a local computer system (10) for storage of the document and for preparation thereof for the output,
    a local processing and control unit (18) which co-operates with the storage unit (30) and with an external data processing installation (14) by way of a data communication network (12) and which is such that an additional operation and/or additional data can be linked with the document as a reaction to at least one online contact by way of the data communication network and the linked document can be prepared for output,
    an output unit (22–28) which is connected to the local processing and control unit and which is adapted for regular output of the linked document, and
    an interrogation and checking unit (36, 38; 46, 48; 50) which co-operates with the storage unit (30) and the processing and control unit (18) and which is adapted to detect violation and/or overriding of the copy protection of the document and as a reaction to such a violation and/or overriding prevents production of the linked document by the processing and control unit,
    wherein the local processing and control unit is such that a document stored in the storage unit remains unchanged in its stored form even by an additional operation and additional data.

2. A device as set forth in claim 1 characterised in that the electronic documents have text data and/or image/graphic data and the additional operation has at least one of the services of updating, management of key words or notes, electronic transmission and exchange of the document by way of the data communication network, search for key words and a blackboard function.

3. A device as set forth in claim 1 or claim 2 characterised in that the additional data have data which are suitable for archiving and/or updating of the electronic document.

4. A device as set forth in one of claims 1 through 3 characterised by a communication unit which co-operates with the processing and control unit and the interrogation and checking unit and which is adapted to produce and/or implement a dialog with an author or information carrier of a relevant document, identified in the external data processing installation, by way of the data communication network.

5. A device as set forth in one of claims 1 through 4 characterised by a registration unit (48, 50) which is local and/or provided in the external data processing installation and which is connected by way of the data communication network and which is adapted as a reaction to the interrogation and checking unit to detect and register electronic documents.

6. A device as set forth in one of claims 1 through 5 characterised in that the device for producing a document state is provided in such a way that at least one preferably strategic word in a document having a text is removed, interchanged in terms of its position and/or exchanged for another word, wherein preferably such a word is a conjunction, a numeral or a verb.

7. A method for the protected output of an electronically transmitted and stored document which is provided with electronic copy protection or which is subject to electronic copy protection, in particular for operation of the device as set forth in one of claims 1 through 6, characterised by the following steps:
    reading a document out of a storage unit provided on a local computer system,
    checking whether the electronic copy protection of the document is violated or overridden,
    linking the electronic document to an additional operation and/or additional data, supplied by way of the data communication network, as a reaction to a checking result of the checking operation, and
    outputting the linked document on an output unit provided in the local computer system.

8. A method as set forth in claim 7 characterised by the implementation of a preferably encrypted online contact with an external data processing installation for the supply operation prior to the linking step.

* * * * *

UNITED STATES PATENT AND TRADEMARK OFFICE
CERTIFICATE OF CORRECTION

PATENT NO. : 6,674,859 B1
DATED : January 6, 2004
INVENTOR(S) : Wittkotter

It is certified that error appears in the above-identified patent and that said Letters Patent is hereby corrected as shown below:

Column 11,
Line 64, after "be prepared for output," insert -- and an output unit which is connected to the local processing and control unit and which is adapted for regular output of the linked document,
    characterised in that --.

Signed and Sealed this

Fourth Day of May, 2004

JON W. DUDAS
*Acting Director of the United States Patent and Trademark Office*